United States Patent [19]

Ito et al.

[11] 4,291,085
[45] Sep. 22, 1981

[54] PACKAGING MATERIAL FOR FOOD TO BE SUBJECTED TO HIGH-TEMPERATURE SHORT-TIME STERILIZATION AND PROCESS FOR THE PREPARATION THEREOF

[75] Inventors: Senji Ito, Ebina; Kenji Suzuki, Yokohama, both of Japan

[73] Assignee: Toyo Seikan Kaisha Limited, Tokyo, Japan

[21] Appl. No.: 682,908

[22] Filed: May 4, 1976

Related U.S. Application Data

[63] Continuation-in-part of Ser. No. 413,256, Nov. 6, 1973, abandoned.

[30] Foreign Application Priority Data

Nov. 10, 1972 [JP] Japan ............................. 47-113388
Jun. 19, 1973 [JP] Japan ............................. 48-068295

[51] Int. Cl.$^3$ ............................................. B65D 65/40
[52] U.S. Cl. .................................. 428/215; 264/176 R; 426/126; 426/127; 426/412; 426/415; 428/412; 428/458; 428/461; 428/475.8; 428/483; 428/500; 428/516; 428/35
[58] Field of Search ............... 426/106, 113, 126, 127, 426/410, 412, 415; 428/458, 461, 483, 500, 412, 475.8, 516, 35; 264/171, 176 R; 526/351

[56] References Cited

U.S. PATENT DOCUMENTS

| | | | |
|---|---|---|---|
| 3,502,541 | 3/1970 | Hermitte et al. ................. | 428/458 |
| 3,556,816 | 1/1971 | Nughes .......................... | 426/126 |
| 3,597,237 | 8/1971 | Nughes .......................... | 426/412 X |
| 3,890,448 | 6/1975 | Ito ................................... | 426/106 X |
| 3,892,058 | 7/1975 | Komatsu et al. ................ | 428/458 X |
| 3,975,463 | 8/1976 | Hirata ............................. | 426/106 |

OTHER PUBLICATIONS

Modern Packaging Encyclopedia, 7/70, vol. 43, No. 7A, pp. 129–131, 34–36, 38, 39, 48, 50, 62–64.

*Primary Examiner*—Steven L. Weinstein
*Attorney, Agent, or Firm*—Diller, Ramik & Wight

[57] ABSTRACT

A packaging material for food to be subjected to high-temperature short-time sterilization, which comprises a flexible laminate sheet including (a) a heat-sealable inner face layer of a crystalline polypropylene, (b) an outer face layer of a thermoplastic or thermosetting resin having a melting point or decomposition point higher than the melting point of said polypropylene and, if desired, (c) an oxygen-barrier layer interposed between said layers (a) and (b), said polypropylene layer being composed of a film of a polypropylene having a melt flow index of 0.5 to 3, said film being characterized in that (i) when the film is extracted in salad oil at 130° C. for 30 minutes, the amount extracted of the polypropylene is smaller than 1500 ppm, (ii) the polypropylene film has a pseudohexagonal crystal form or a crystal form of a combination of the pseudohexagonal system and α-monoclinic system and a degree of orientation not higher than 3.0 and (iii) the surface of the polypropylene film confronting the layer (b) has a tension in the wet state (wetting tension $T_1$) of at least 38 dyne/cm when it is allowed to stand still in an atmosphere of a temperature of 20° C. and a relative humidity of 40% for 1 week.

18 Claims, 10 Drawing Figures

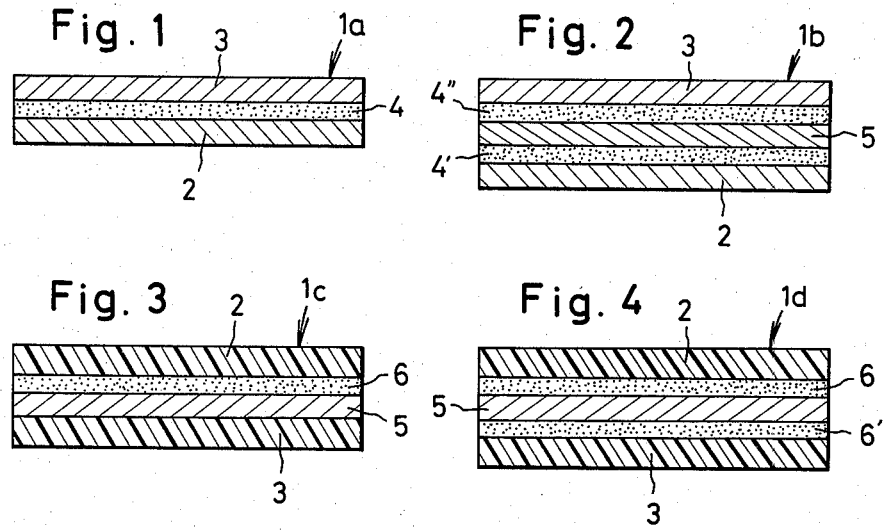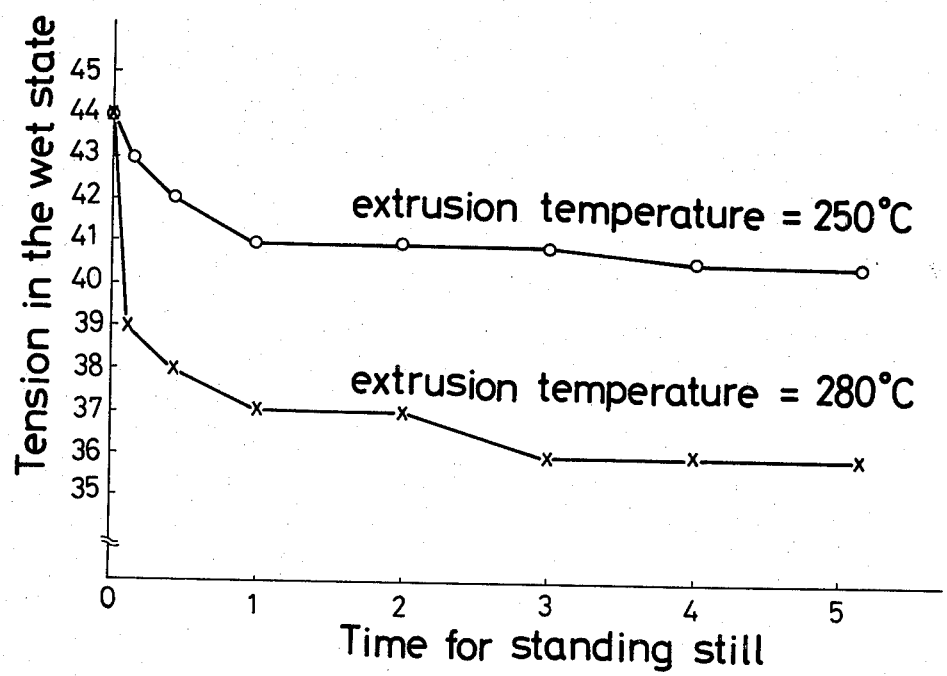

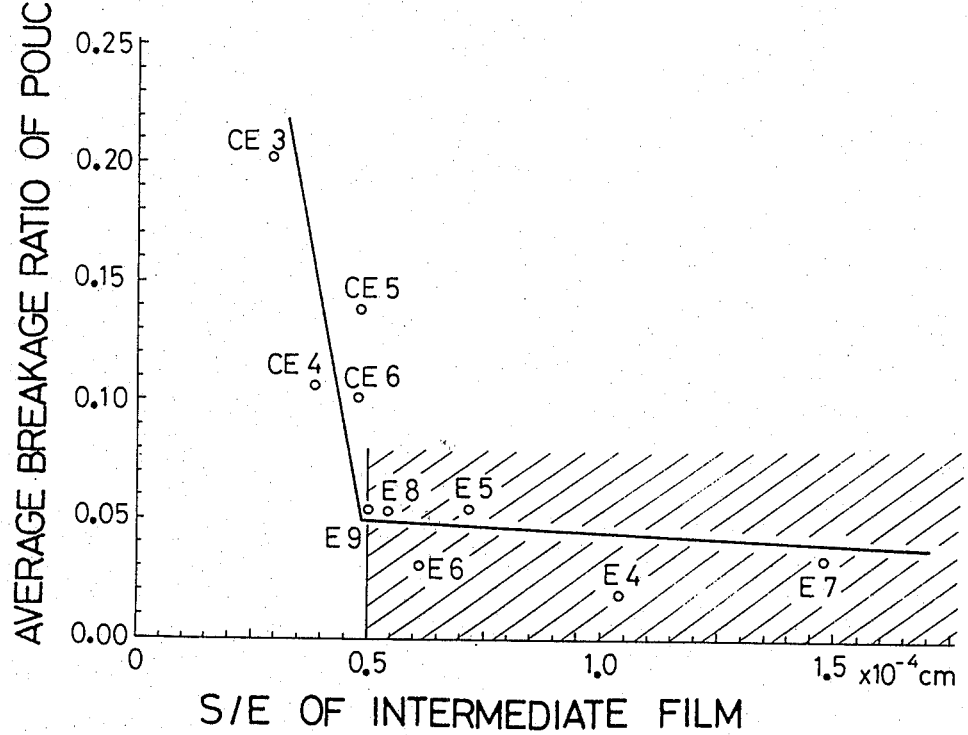
Fig. 6
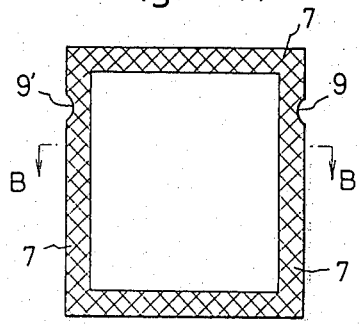
Fig. 7-A
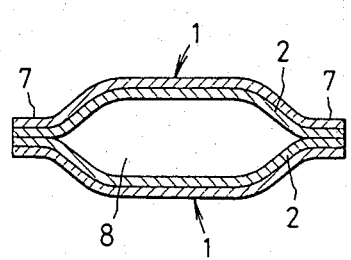
Fig. 7-B
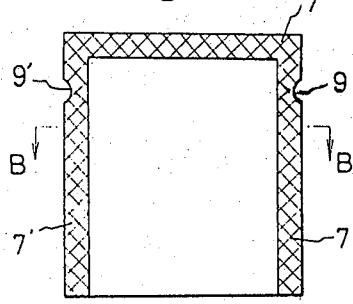
Fig. 8-A
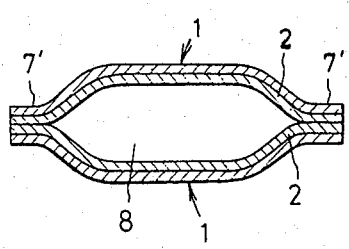
Fig. 8-B

PACKAGING MATERIAL FOR FOOD TO BE SUBJECTED TO HIGH-TEMPERATURE SHORT-TIME STERILIZATION AND PROCESS FOR THE PREPARATION THEREOF

This application is a continuation-in-part application of the application Ser. No. 413,256 filed Nov. 6, 1973 which has now been abandoned.

This invention relates to a packaging material for a substance which is to be subjected to a high-temperature short-time sterilization process and a process for the preparation thereof.

So called cans and retortable pouches have been used as packages or containers for preserving foods or precooked foods without particular preservation treatments such as freezing. A typical retortable pouch is one prepared by laminating a layer of a heat-sealable resin such as polyethylene with a layer of a heat-resistant resin optionally with an intermediate layer composed of a metal foil, molding the laminate sheet into a bag-like form so that the heat-sealable resin layer constitutes the inner face, filling a food or the like into the molded bag and heat-sealing the periphery of the food-containing portion.

After filling these packages are sterilized at 100° to 120° C. for 20 to 90 minutes in a high pressure vessel called a "retort" by hot water or steam. However, if the sterilization is conducted for such a long time, the content is excessively boiled; this causes decomposition of coloring materials and deformation of the content, and the quality of the food content is frequently degraded.

It is known that the time required for killing bacterial spores by heating is shortened logarithmically with elevation of the temperature. It has been found that if the sterilization is conducted at 140° C., satisfactory results can be obtained by carrying out the treatment for 1 to 2 minutes and that at 150° C. it is sufficient to conduct the sterilization for a period of 10 to 600 seconds. Since a retortable pouch has a much smaller sectional thickness than a can container, the time required for the heat to be transferred to the central portion of the food is much shorter than in the case of a can. Thus it has been found to subject a food package consisting of a retortable pouch and a food contained therein to high-temperature short-time sterilization to improve and taste and flavour of the food.

However, the results of such high-temperature short-time sterilization processes have not been satisfactory because no satisfactory inner face-constituting material has been found. In high-temperature short-time sterilized food packages, an inner face-constituting laminate material is required to have the following properties.

(1) Since the resinous material to be used comes into contact with food at a high temperature during the sterilization step, migration of the resinous material into the food at such high temperatures should be avoided. In other words, the resinous material should have a high resistance to extraction.

(2) The resinous material to be used as an inner layer should, of course, have a heat sealability. Further, this resinous material and the heat-sealed area should have a heat resistance high enough to endure the high-temperature short-time sterilization treatment. In other words, the resin should have the combination of an excellent heat-sealability and a high heat resistance.

(3) The heat-sealed area should have a sufficient seal strength even after the high-temperature short-time sterilization, and a good seal should be retained at the sealed area.

(4) Since a laminate material undergoes very severe conditions during the sterilization treatment, delamination frequently occurs at the bonded interface between the inner and outer layers or between the inner and intermediate layer. The resinous material to be used as the inner layer should have a sufficient resistance to interlaminar delamination.

(5) In the case of a package composed of a laminate sheet with no intermediate oxygen-barrier layer (such as a layer of a metal foil), the gas permeability should be maintained at a low level after the high-temperature short-time sterilization treatment.

None of the known inner face-constituting materials meets the above requirements sufficiently. For instance, low density or medium density polyethylene has been used as an inner face-constituting material of a heat-sealable laminate sheet. However, in the case of such polyethylene, considerable amounts of resin-constituting components are extracted and migrate into the food during the high temperature sterilization. Further, the heat-sealed area fails to resist the high temperature sterilization treatment sufficiently.

An oriented polypropylene film (OPP) which is frequently used as a packaging material is considerably superior to polyethylene with respect to the heat resistance, but the range of temperatures at which heat sealing may be carried out is extremely narrow and it is difficult to conduct the heat sealing step on a commercial scale. Further, the heat-sealed area has an extremely poor seal strength and impact resistance after high temperature sterilization in a retort, and the oriented polypropylene film is also defective in that delamination readily occurs between the polypropylene layer and a metal foil intermediate layer or outer heat-resistant layer.

There is also known a retortable flexible pouch comprising an undrawn polypropylene film such as a cast polypropylene film as a sealable inner face material of a laminate sheet. This pouch can be used at a low sterilization temperature, for example, 120° C. or lower, but during high temperature heat sterilization conducted at 130° to 150° C. the polypropylene inner face layer is readily peeled from the laminate sheet substrate. This is a fatal defect of the container of this type.

We found that if a film of a polypropylene having a specific crystal form, a specific orientation and a tension in the wet state is used as a heat-sealable inner face layer of a flexible laminate sheet, there can be obtained a packaging material of the laminate sheet which is satisfactory in all of the heat sealability, heat resistance, sealing property and interlamina peel strength even when the packaging material is subjected to high-temperature short-time sterilization at 130° to 150° C.

In accordance with the present invention, there is provided a packaging material for food to be subjected to high-temperature short-time sterilization, which comprises a flexible laminate sheet including (a) a heat-sealable inner face layer of a crystalline polypropylene, (b) an outer face layer of a thermoplastic or thermosetting resin having a melting point or decomposition point higher than the melting point of said polypropylene and, if desired, (c) an oxygen-barrier layer interposed between said layers (a) and (b), said polypropylene layer being composed of a film of a polypropylene having a melt flow index of 0.5 to 3, said film being characterized in that (i) when the film is extracted in salad oil at 130° C. for 30 minutes, the amount extracted of the polypropylene is smaller than 1500 ppm, (ii) the polypropylene film has a pseudohexagonal crystal form or a cyrstal form of a combination of the pseudohexagonal system and α-monoclinic system and a degree of orientation not higher than 3.0 and (iii) the surface of the polypropylene film confronting the layer (b) has a tension in the wet state (wetting tension, $T_1$) of at least 38 dyne/cm when it is allowed to stand still in an atomsphere of a temperature of 20° C. and a relative humidity of 40% for 1 week.

The packaging material of the invention can be formed into bags whose inner surfaces are constituted by the polypropylene layer (a) and whose outer surfaces are constituted by the heat-resistant resin layer (b) and the edges of the bag can be heat-sealed. Such a bag containing a suitable food-stuff can be subjected to a high temperature-short time (HTST) sterilization process. Such processes are well known in the art and typically involve a treatment at a temperature in the range of 130° to 150° C. for a relatively short time such as 10 to 600 seconds. It has been found that although an aluminum foil is generally satisfactory as the oxygen-barrier layer, in some cases the impact resistance of the package is insufficient and if the package has a heavy content such as a liquid food and the filled package is dropped, breakage frequently occurs. However, it has been found that if an impact-absorbing layer composed of a thermoplastic resin layer having certain specific properties is interposed between the polypropylene layer and the aluminum foil intermediate layer, the impact resistance of the food package can be greatly improved. Thus according to a preferred embodiment of this invention, there is provided a packaging material comprising (a) a heat-sealable layer of a crystalline polypropylene having the properties specified above (b) a heat-resistant resin layer (c) an aluminium foil layer interposed between layers (a) and (b) and (d) a layer or layers of thermoplastic resin interposed between layers (a) and (c) and/or layers (b) and (c), said thermoplastic resin having an impact-absorbing coefficient, $K_I$ (as hereinafter defined) of at least $0.5 \times 10^{-4}$ cm.

The impact-absorbing coefficient, $K_I$, is defined by the relationship $K_I = S/E$ (1) where S is the load (in Kg/cm) of the resin film having a width of 1 cm under 30% elongation and E is the tensile strength (in Kg/cm$^2$) of the resin film, S and E both being measured after the HTST treatment. The measurement of $K_I$ is described in more detail below.

This invention is illustrated by reference to the accompanying drawings, in which:

FIGS. 1 to 4 are diagrammatic sectional views showing the structure of typical laminates of this invention;

FIG. 5 is a diagram illustrating a relation between the time for standing still and the tension in the wet state in polypropylene films differing in the extrusion temperature;

FIG. 6 is a graph showing the relation between the impact-absorbing coefficient and the average pouch breakage ratio;

FIG. 7-A is a front view of a packaged article of this invention;

FIG. 7-B is a section taken along the line B—B of FIG. 7-A;

FIG. 8-A is a front view of another packaged article of this invention; and

FIG. 8-B is a section taken along the line B—B of FIG. 8-A.

The laminate sheet of this invention has a multi-layer structure composed of two, three or more layers. For instance, the laminate sheet 1a illustrated in FIG. 1 has a two-layer structure composed of a polypropylene layer 2 and a heat-resistant, resin layer 3, which are bonded together through an adhesive layer 4. The laminate sheet 1b illustrated in FIG. 2 has a three-layer structure composed of a polypropylene layer 2, a heat-resistant layer 3 and an oxygen-barrier layer 5 interposed between said layers 2 and 3, every two adjacent layers being bonded together through an adhesive layer 4' or 4''.

As mentioned above, a particularly preferred laminate sheet has a multi-layer structure including an inner polypropylene layer, an aluminum foil intermediate layer, an outer heat-resistant resin layer and an impact-absorbing layer interposed between the aluminum foil and the polypropylene layer and/or the heat-resistant resin layer. For instance, the laminate sheet 1c illustrated in FIG. 3 has a multi-layer structure including a polypropylene layer 2, an impact-absorbing layer 6, an aluminum foil 5 and a heat-resistant resin layer 3, and if necessary, an adhesive layer (not shown) may be interposed between every two adjacent layers. Further, the laminate sheet may have a multi-layer structure as illustrated in FIG. 4, comprising an inner polypropylene layer 2, and impact-absorbing layer 6, an aluminum foil 5, another impact-absorbing layer 6' and a heat-resistant resin layer 3, and if necessary, an adhesive layer (not shown) may be formed between every two adjacent layers.

As pointed out above, the most characteristic feature of this invention is that a polypropylene film layer having the specific salad oil extraction ratio, degree of orientation, crystal form and tension in the wet state is employed as the heat-sealable resin layer of the laminate sheet.

Polypropylene Film

The popypropylene film that is used in the invention is prepared from a crystalline polypropylene having a melt flow index (MFI) of 0.5 to 3, especially 0.8 to 2.5 according to known technique. More specifically, it can be prepared by melting the above crystalline polypropylene in a known extruder, extruding the melt into open air in the form of a film at a film-forming temperature of 230° to 260° C., especially 245° to 255° C., through a known T-die, contacting the extruded film with the surface of a known chill roll or with water to cool rapidly and solidify the film and subjecting the surface of the solidified film to a known corona discharge treatment.

In the instant specification, by the term "film-forming temperature" is meant the temperature of the resin at the outlet of the die. The "melt flow index" indicates an amount (expressed in the gram unit) of a polymer flown for 10 minutes when the polymer is flown from a nozzle having a diameter of 2.095 mm and a length of 8 mm at 230° C. under a load of 2.16 Kg.

In order to make it possible to subject the packaging material of the invention to a high-temperature shorttime sterilization treatment at a temperature of 130° to 150° C., it is important that the polypropylene that is used in the invention should have such a property that when the polypropylene film is extracted in salad oil at 130° C. for 30 minutes, the amount extracted of the polypropylene is not larger than 1500 ppm. Each of polyethylenes used heretofore for retortable pouches has a salad oil extraction ratio considerably higher than 1500 ppm when extracted under the above conditions. When these polyethylenes are used, during the high-temperature short-time sterilization treatment the polyethylenes migrate into packaged foods. This migration of the resin is not preferred from the sanitary viewpoint and infects packaged foods with a so-called "polymer smell", and one of the advantages of the high-temperature short-time sterilization process, high flavor-retaining property, is lost. Further, most of modified polypropylenes formed by adding a resin such as rosin to improve the heat sealability and coated polypropylenes having a surface coated with other thermoplastic resin have a salad oil extraction ratio exceeding 1500 ppm, and use of these polypropylenes is not preferred from the sanitary viewpoint and in view of reduction of the flavor-retaining property.

In the case where an inner layer-constituting material having a salad oil extraction ratio higher than 1500 ppm is employed, it is found that during the high-temperature heat sterilization treatment, outer layers such as the metal foil layer and the heat-resistant resin are frequently exposed to the packaged food, causing formation of pin holes or destruction of the gas-tight seal.

In the invention, by using a specific crystalline polypropylene, namely an isotactic polypropylene, having a melt flow index of 0.5 to 3, especially 0.8 to 2.5 and preparing a film from this specific crystalline polypropylene under the above-mentioned film-forming conditions, it is possible to control the above-mentioned salad oil extraction ratio at a level lower than 1500 ppm, preferably lower than 500 ppm, and further, infection of a packaged food with a polymer smell or migration of the resin into the packaged food can be effectively prevented during the high temperature heat sterilization treatment and the air-tightness can be maintained assuredly.

Suitable polypropylenes are isotactic polypropylenes having the above melt flow index. In order to improve the processability during the film-shaping step, it is possible to employ modified polypropylenes formed by copolymerizing propylene with ethylene or other comonomers in an amount not damaging the stereoregularity of the polypropylene, for instance, in an amount of less than 15% by weight, especially 2 to 10% by weight, based on the total copolymer, by block copolymerization, random polymerization or graft polymerization, or polypropylene blends formed by blending an isotactic polypropylene with high density polyethylene, ethylene-propylene rubber or other polyolefin in an amount not damaging the inherent properties of the isotactic polypropylene, for instance, in an amount of less than 10% by weight based on the total blend. Needless to say, these copolymers or polymer blends should have a melt flow index and a salad oil extraction ratio within the above ranges.

In order to attain a high interlaminar peel strength, it is important that a polypropylene having a melt flow index of 0.5 to 3 should be shaped into a film at the above film-forming temperature. For example, as illustrated in Comparative Example 1 given hereinafter, a film prepared from a polypropylene having a melt flow index within the above range under customary film-forming conditions, for example, at a film-forming temperature of 280° C., has a tension in the wet state of 44 dyne/cm just after preparation, but if it is allowed to stand still in an atmosphere of a 20° C. and a relative humidity of 40% for one week, the tension in the wet state is drastically reduced as shown in FIG. 5 and it is only 37 dyne/cm. When a flexible laminate sheet comprising this polypropylene film as the heat-sealable inner face layer is subjected to the retort sterilization treatment at 135° C., interlaminar peeling is readily caused from a heat-resistant film, an aluminum foil or an impact-absorbing layer described below. In contrast, a film prepared from a polypropylene having a melt flow index within the above range at a film-forming temperature of 230° to 260° C., especially 245° to 255° C., according to the invention has a tension in the wet state of at least 38 dyne/cm, especially at least 40 dyne/cm, even if it is allowed to stand still in the above atmosphere for one week, and in a laminate formed by bonding this polypropylene film to an aluminum foil interlaminar peeling is not caused at all even when it is subjected to the retort sterilization treatment at 135° C.

In the instant specification, the tension in the wet state is determined according to the method specified in ASTM D 2587-67.

A polypropylene film preferably used in the invention has a reduction ($\Delta W$) of the tension in the wet state, expressed by the following formula, of not higher than 6 dyne/cm, especially not higher than 4 dyne/cm:

$$\Delta W = W_o - W_1$$

wherein $W_o$ denotes a tension (dyne/cm) in the wet state of the polypropylene film just after preparation and $W_1$ denotes a tension (dyne/cm) in the wet state after it has been allowed to stand still in an atmosphere of a temperature of 20° C. and a relative humidity of 40% for one week.

The polypropylene film used in the invention is characterized in that it has a crystal form of the pseudohexagonal system or of a combination of the pseudohexagonal system and $\alpha$-monoclinic system and a degree of orientation not higher than 3, especially 0.4 to 2.3.

The crystal form of a polypropylene film can easily be determined by an X-ray diffraction method such, for example, as that taught by Maso Sumito et al in "X-Ray Diffraction of Polymers" (published by Maruzen) or by Leroy E. Alexander in "X-Ray Diffraction Methods in Polymer Science" (published by Wiley-Inter Science).

The degree of orientation is determined by the following method taught by Yasumori Nishijima et al, J. Polymer Science, Part C, 15 (1966), pages 237-250.

A polypropylene sample is impregnated with a solution of a fluorescent whitening agent (Whitex manufactured by Sumitomo Chemicals) in benzene, in which the concentration of the fluorescent whitening agent is 5 mg/100 Ml, and the fluorescent polarization intensity is determined by employing a polarizing fluorophotometer (Model FOM-1 manufactured by Nippon Bunko Kogyo K. K.). The degree of orientation is then calculated from the following formula:

$$\text{degree of orientation} = P/(1-P)$$

wherein P is a value expressed by the following formula $$P = (I_{\parallel} - I_{\perp})/(I_{\parallel} + I_{\perp}) \tag{3}$$

in which symbol $I_{\parallel}$ indicates the component of the fluorescent polarization intensity parallel to the excited ray, and symbol $I_\perp$ indicates the component of the fluorescent polarization intensity parpendicular to the excited ray.

The known crystal forms of isotactic polypropylene are those of the α-, β-, γ- and δ-types and the pseudohexagonal system. In this invention, by employing a polypropylene film having a crystal form substantially of the pseudohexagonal system or a combination of the pseudohexagonal system and α-monoclinic system, it is possible to use a heat-sealing temperature in a broad range such as 200° to 320° C. and heat shrinkage during the heat-sealing step can be reduced. This means that the heat-sealing operation can be greatly facilitated and the elasticity of the polypropylene layer after the high temperature sterilization of the package can be maintained at a high level. In addition, it is possible to keep the gas permeation resistance (gas-barrier property) of the laminate material in a relatively good condition.

In order to maintain the seal strength of the heat-sealed area of the packaged article at a high level even after the high temperature heat sterilization treatment and prevent delamination between the inner polypropylene layer and the intermediate oxygen barrier layer, it is very important that the degree of orientation of the polypropylene film used in the invention is not higher than 3, especially within a range of 0.4 to 2.3. As will be apparent from the results shown in Table 2 given hereinafter, in a food packaged article comprising a laminate sheet formed by using a polypropylene film having a degree of orientation higher than 3, such as a known OPP film, the seal strength of the heat-sealed area is considerably reduced after the high temperature heat sterilization treatment and delamination or reduction of the interlaminar peel strength is caused by shrinkage of the polypropylene film layer. In contrast, in the packaged article comprising a laminate sheet prepared by using a polypropylene having a degree of orientation within the range specified in the invention, the seal strength of the heat sealed area after the high temperature heat sterilization treatment is much higher than the seal strength of the heat sealed area of the packaged article including a polyethylene film having a degree of orientation outside the range specified in the invention, and delamination of the laminate sheet is not caused and the interlaminar peel strength is maintained at a high level.

The above-mentioned crystal form and degree of orientation can be attained very easily by contacting the film extruded at the above-mentioned film-forming temperature with the surface of a chill roll while controlling the surface temperature of the chill roll at 20° to 70° C., especially 30° to 50° C., to thereby cool rapidly and solidify the film. Then, the cooled and solidified film is subjected to a known corona discharge treatment and wound on a roll without substantial stretching. Various modifications can be made to the preparation of a polypropylene film that is used in the invention, so far as the film is shaped under the above-mentioned specific film-forming conditions and the shaped film is rapidly cooled in the above-mentioned manner. For example, any of known dies such as a manifold die, a fish-tail die and a coathanger die can be used as the T die, and a known polypropylene extruder having an L/D ratio of at least 20 can be used as the extruding machine.

Heat Resistant Outer Layer

The heat resistant layer (b) preferably comprises a thermoplastic resin or thermosetting resin having a melting point or decomposition point higher than the melting point of the polypropylene layer (a), employed as the heat-resistant resin. Suitable such resins include polyesters, polyamides, polycarbonates, biaxially stretched polypropylenes and cellulose esters. Specific examples of suitable heat-resistant resins are as follows:

(a) Polyesters and copolyesters comprising recurring units expressed by the following formula

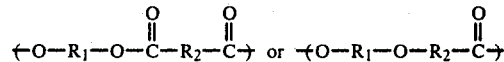

wherein $R_1$ is an alkylene or cycloalkylene group having 2 to 8 carbon atoms, and $R_2$ is an arylene group. such as polyethylene terephthalate, polyethylene naphthalate, polyethylene terephthalate/isophthalate, poly-1,4-cyclohexylene dimethylene terephthalate and polyethylene hydroxybenzoate.

(b) Polyamides and copolyamides comprising recurring units expressed by the following formula

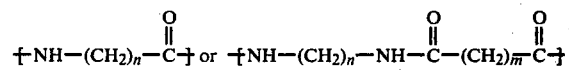

wherein n is a number of 3 to 13 and m is a number of 4 to 11, such as polycaprolactam, polylauryl lactam, polyhexamethylene adipamide and polyhexamethylene sebacamide.

(c) Polycarbonates comprising recurring units represented by the following formula

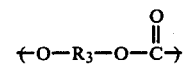

wherein $R_3$ is a hydrocarbon group having 8 to 15 carbon atoms, such as poly-dihydroxydiphenylmethane-carbonate, poly-dihydroxydiphenylethane-carbonate, poly-dihydroxydiphenyl-2,2-propane-carbonate, and poly-p-xyleneglycol-bis-carbonate.

(d) Biaxially stretched isotactic polypropylene films (since a biaxially stretched isotactic polypropylene film has a melting point higher than that of the polypropylene film used as the inner layer in this invention, it can be used as an outer heat-resistant resin layer).

(e) Cellulose esters such as acetyl celluloses of varying degrees of acetylation.

(f) Fluorine-containing resins such as polyvinyl fluoride, polytetrafluoroethylene and tetrafluoroethylene-hexafluoropropylene copolymers.

In addition to the foregoing resins, various infusible (thermosetting) resins, such as heat-resistant polymers containing heterocyclic rings such as imide, imiazopyrrolone, imidazole, oxazole, oxadiazole and thiazole rings can be used as the heat-resistant resin. Preferred examples of such heat-resistant polymers are polyimides, polyamide-imides, polyester-imides, polyamide-imide-esters, polyester-amide-imides, polyamide-imidazopyrrolone-imides, polyimide-imidazopyrrolone-imides, polyester-imide-imidazopyrrolones, polybenzoxazole-imides, polyimide-oxadiazoles, polysulfone-ether-imides, polyimide-benzoxazole-imides, organopolysilozane-imides, polybenzimidazole-imides, polyoxadinone-imides, polybenzthiazole-imides, polybenzimidazole-imidazopyrrolone-imides, polybenzoxadinone-imidazopyrrolone-imides, polybenzthiazoleimidazopyrrolone-imides, polybenzoxazole-imidazopyrrolone-imides, polyimide-ureas, polybenzoxazoles, polybenzimidazoles, polybenzthiazoles, and mixtures of two or more of these polymers.

These infusible heat-resistant resins may be formed into outer heat-resistant layers, for instance, by coating a solution of a precursor of such resin on the surface of a metal foil and baking the coated solution. It is possible to make such a heat-resistant resin layer act also as the oxygen-barrier layer. If desired, a suitable pattern or figure may be printed on the outer or inner surface of such a heat-resistant resin layer.

Oxygen-barrier Layer

The laminate sheet of this invention can have an intermediate layer acting as an oxygen-barrier layer between the above-mentioned inner propylene layer and outer heat-resistant resin layer. Metal foils such as an aluminum foil are preferably used as the oxygen-barrier layer, but other barrier layers, such as a layer of a saponified product of an ethylene-vinyl acetate copolymer having an ethylene content of 25 to 50% and a degree of saponification of at least 96%, can also be used.

Impact-absorbing Layer

In a preferred embodiment of this invention, an impact-absorbing layer composed of thermoplastic resin having certain specific properties is interposed between the above-mentioned inner polypropylene layer and an aluminum foil acting as the intermediate oxygen-barrier layer. The impact-abosrbing layer must have an impact-absorbing coefficient, $K_I$ (as hereinbefore defined), of at least $0.5 \times 10^{-4}$ cm, especially at least $1.0 \times 10^{-4}$ cm.

The impact-absorbing coefficient may be determined by the following method:

A resin film is subjected to a retort treatment at 135° C. for 10 minutes and the retorted sample is pulled at room temperature at a pulling rate of 200 mm/min in the machine direction of the film and the direction parpendicular thereto, respectively, and the load (S expressed in Kg/cm width of film) is measured when the film sample is elongated by 30%. Then, an identical sample (i.e. a retorted sample) is pulled at the same temperature and pulling rate in the same pulling directions as above, and the tensile modulus (E expressed in Kg/cm²) is measured. For each of the machine direction and the direction parpendicular thereto, the value of the tensile load (S) is divided by the tensile modulus (E), and the smaller of the two values thus obtained is the impact-absorbing coefficient ($K_I$). In general, owing to the configurative limitation of pouches prepared on an industrial scale, the falling strength, namely the impact strength, of the food package depends on the S/E value obtained with respect to the machine direction.

Examples of thermoplastic resin films having impact-absorbing coefficients within the specified range are stretched or unstretched films of polamides, copolyamides, polycarbonates, polyesters, polyester-polyethers or polyester-polylactones. Each of these resin films is commercially easily available as a packaging film. Films having a $K_I$ value within the above range are selected among commercial products.

Liner aliphatic polyamides or copolyamides comprising the recurring units described under heading (b) above are preferably used if a polyamide or copolyamide constitutes the impact-absorbing layer. Of course, a polyamide or copolyamide having a cycloalkylene group in the molecule, such as poly-1, 4-cyclohexylene adipamide, can be used instead of such an aliphatic polyamide.

Polycarbonates having the recurring units described under heading (c) above can be used if a polycarbonate constitutes the impact-absorbing layer.

Polyester-polyethers comprising recurring units expressed by the following formula

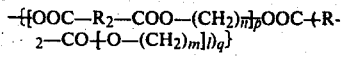

wherein $R_2$ is a phenylene group, n is a number of from 2 to 4, m is a number of from 2 to 5, l is a number of at least 2, especially from 6 to 100, and p and q stand for a number of at least 2, are preferably used if a polyester-polyether constitutes the impact-absorbing layer. Examples of suitable polyester-polyethers are polyoxyethylene-ethylene terephthalate, poly-1,4-oxybutylene-1,4-butylene terephthalate, polyoxyethylene-ethylene terephthalate/isophthalate, poly-1,3-oxypropylene-1,4-butylene terephthalate, poly-1,2-oxypropylene-1,4-butylene terephthalate and poly-1,4-oxybutylene-oxyethyleneethylene terephthalate.

Preferred examples of polyester-polylactones are poly-ε-caprolactone-polyethylene terephthalate and poly- -caprolactone-polyethylene terephthalate/isophthalate.

These polyester-polyethers and polyester-polylactones are usually known as polyester elastomers.

The polyamides, polycarbonates or polyester elastomers can be used in the form of a stretched film, i.e., a monoaxially or biaxially stretched film, or an unstretched film.

A stretched polypropylene film having an impact-absorbing coefficient within the above-mentioned range can be used as the impact-absorbing layer, but an ordinary unstretched polypropylene film or a stretched polypropylene film having an impact-absorbing coefficient outside the specified range does not function as an impact-absorbing layer.

The criticality of the use of a thermoplastic resin having an impact-absorbing coefficient within the specified range as the impact-absorbing layer will readily be understood from the Examples and FIG. 5 of the accompanying drawings.

More specifically, as is shown in Example 4, a package formed from a laminate sheet including a polypropylene layer bonded directly to an aluminum foil shows a considerable tendency to break when it is subjected to the falling test in the food-packed state after a retort treatment. Further, even when a resin film having an impact-absorbing coefficient less than $0.5 \times 10^{-4}$ cm, such as a polyethylene terephthalate film, polyethylene naphthalate film or stretched polypropylene film is interposed between the polypropylene layer and aluminum foil, as illustrated in FIG. 5, the pouch breakage tendency is relatively high. In contrast, when the film interposed between the polypropylene layer and aluminum foil has an impact-absorbing coefficient of $0.5 \times 10^{-4}$ cm or more, the average pouch breakage ratio is sifnificantly improved and can be maintained as low as 0.05 or less. The "average pouch breakage ratio" is defined by the following formula PR=(number of broken pouches)/(total frequency of falling of pouches)

In view of the heat-sealability of the package and the form-retaining property during the retort treatment, it is preferred that the resin film to be used as the impact-absorbing layer has a melting point higher than the melting point of the polypropylene used as layer (a). In order to prevent occurrence of delamination between the inner polypropylene layer and the impact-absorbing layer or between the impact-absorbing layer and the aluminum foil and to improve the impact resistance of the package after the retort treatment, it is especially desired that the thermoplastic resin film used as the impact-absorbing layer has a free surface energy of at least 35 dyne/cm, preferably at least 40 dyne/cm, as measured according to the method described in ASTM D2578-67.

In order to meet all of the foregoing requirements, the impact-absorbing layer is preferably composed of a polyamide, a polycarbonate or a polyesterpolyether, and polyamides such as nylon 6, nylon6-6 and nylon 12 are especially preferred. Stretched films of these polyamides are usually defective in that the dimension stability under wet and hot conditions is poor. For instance, when they are subjected to the retort treatment at 135° C. for 10 minutes, a shrinkage of 10 to 15% is brought about. In contrast, if such a nylon film is interposed between the polypropylene layer and aluminum foil in a laminate of the invention and the peripheral portion of the laminate is heat-sealed, the tendency to shrinkage is not observed and no dimensional change is brought about. This fact is quite surprising.

In general, it is preferred that the impact-absorbing layer has a thickness of from 5 to 40 microns, especially 15 to 30 microns. If the thickness of the impact-absorbing layer is less than 5 microns, no sufficient improvement of the impact resistance can be attained, and when the thickness exceeds 40 microns, no particular effect or advantage is attained and disadvantages occur at the heat-sealing step because of the increased thickness of the package as a whole.

Laminate Sheet

The bonding of the layers of the laminate of the invention can be accomplished by various means. For instance, the bonding can be performed using an adhesive such as a thermosetting resin adhesive, e.g., isocyanate type adhesives, epoxy type adhesives and isocyanate-epoxy type adhesives, and synthetic rubber adhesives and thermoplastic resin adhesives which are used in the art for layer bonding. In this invention, however, in view of the primary object, i.e., the object of preparing high-temperature short-time sterilized food packages, it is especially preferred that isocyanate type adhesives, epoxy type adhesives and isocyanate-epoxy type adhesives are employed.

These adhesives of the isocyanate, epoxy and isocyanate-epoxy types are well known in the art and details thereof are disclosed in, for instance, O. Bayer, Mod. Plastics, 24, No. 10, 149 (1947), U.S. Pat. Nos. 3,510,439 and 1,154,612, and I. H. Sauders, "Polyurethanes Chemistry and Technology, II, Technology, page 609" (published by Wiley-Inter Science).

The bonding is performed so that the surface of the polypropylene film which has been subjected to the corona discharge treatment and a tension in the wet state within the above range is made to confront the heat resistant resin layer, the oxygen-barrier intermediate layer or the impact absorbing layer.

In the preferred embodiment of this invention, the impact-absorbing layer can be bonded to the aluminum foil or polypropylene layer without using a particular adhesive. For instance, polyamides such as nylon 6 and nylon 12 are excellent hot melt adhesives. Accordingly, when a polyamide film is used as the impact-absorbing layer, the polyamide is heated and fused on the metal foil and/or the polypropylene and is bonded thereto.

The laminate sheet to be used in this invention should be flexible and the thickness of each layer should be selected so that the heat-sealing operation or the high temperature heat sterilization treatment can be conveniently carried out. Preferred thicknesses are as follows.

| A. Laminates with no impact-absorbing layer | | |
| --- | --- | --- |
| | Two-Layer Structure | Three-Layer Structure |
| Inner Polypropylene Layer | 30–100 μ | 30–100 μ |
| Oxygen-Barrier Intermediate Layer | | 10–50 μ |
| Outer Heat-Resistant Resin Layer | 10–50 μ | 2–30 μ |
| Total Thickness | 40–150 μ | 42–180 μ |

| B. Laminates with one or two impact-absorbing layers | | |
| --- | --- | --- |
| | Thickness | Especially Preferred Thickness |
| Inner Polypropylene Layer | 30–100 μ | 40–70 μ |
| Impact-Absorbing Layer(each) | 5–40 μ | 15–30 μ |
| Aluminum Foil | 5–20 μ | 7–15 μ |
| Outer Heat Resistant Resin Layer | 5–20 μ | 10–15 μ |
| Total Thickness | 45–180 μ (with one impact-absorbing layer) 50–220 μ (with two impact-absorbing layers) | 72–130 μ 87–160 μ |

Packages may be formed as illustrated in FIGS. 7-A and 7-B, in which two flexible laminate sheets 1 and 1 are superimposed and the side edge portions 7 (4 side edges) are heat-sealed. A food-containing portion 8 is formed between the two laminate sheets 1 and 1. The heat-sealed side edge portions 7 are formed by fusion bonding of two facing polypropylene layers 2 and 2 of the two flexible laminate sheets 1 and 1. In order to facilitate opening of this packaged article, it is possible to provide notched portions 9 and 9' at the side edge slightly below one of the sealed side edge portions.

Instead of the foregoing method using two flexible laminate sheets, the method illustrated in FIGS. 8-A and 8-B, in which one flexible laminate sheet is folded and the three side portions 7' are heat-sealed to form a packaged article, can also be used.

Generally, the flexible laminate sheet material is fed to a conventional automatic bag-making machine, and side end portions are heat-sealed except one side end portion acting as an opening for introduction of the contents. This heat sealing operation can be accomplished by applying the temperature and pressure necessary for heat-sealing of the polypropylene layer to the portions to be heat-sealed. In general, the temperature adopted for heat sealing ranges from 150° to 320° C. and the pressure applied to the area to be heat-sealed is within a range of from 1 to 10 Kg/cm².

The heat sealing operation can be performed by any means capable of melt bonding confronting polypropylene layers, for example, means applying heat from the outside of the laminate sheet, such as a heating bar, a heating knife, a heating wire or an impulse seal, or on a ultrasonic seal on an induction heating seal.

Packaging and Sealing

Before sterilization, a food is placed in the above-mentioned pouch-like or bag-like package, and the opening is heat-sealed. If necessary, degasification is conducted prior to heat-sealing.

A variety of pre-cooked or semi-cooked foods which are retort-sterilized prior to preservation and heated prior to eating or drinking if necessary are suitable as foods to be packaged. Examples of these foods are as follows:

Stews such as pre-cooked curry, pre-cooked hash, borsch and beef stew; gravy such as meat sauce; boiled vegetables, fish and meats such as vinegared pork, sukiyaki, Chinese food paste of beef and vegetables, Chinese hotchpotch, boiled asparagus and cream-boiled tuna; soups such as consomme soup, potage soup, miso soup, pork-incorporated miso soup and vegetable soup cooked with oil; rice foods such as boiled rice, rice boiled with red beans, toasted boiled rice, frizzled boiled rice, pilau and rice-gruel; noodles such as spaghetti, buckwheat vermicelli, wheat vermicelli, Chinese noodle and Italian noodle; compound condiments such as those for toasted boiled rice or Chinese noodle soupl luxury foods such as boiled red beans, thick bean-meal soup with sugar and rice cake and sugared boiled red beans with fruits and jelly; and processed fish and meat products such as quendle; hamburger, corn beef, ham, sausage, roast fish, smoked fish, bacon and boiled fishpaste.

After a food is placed in the package, gases having bad influences on high temperature heat sterilization of the food content or preservation thereof, such as air, are removed. Degasification can be carried out, for example, by a vacuum deaeration method, a hot packaging method, a boiling deaeration method, a steam-projecting method on a method comprising deforming a package under application of a pressure to exclude gas bubbles contained in the interior of the package. The opening of the bag is then heat-sealed in the same manner as described above.

A heat-sealed package of the invention containing a food therein can be subjected to a high-temperature short-time heat sterilization in a retort. The retort is maintained at 130° to 150° C. Since the pressure inside the package increases at such a high retort temperature, the heat sterilization is conducted under a pressure of air and/or steam ranging from 0.5 to 7 Kg/cm² gauge.

The time required for the heat sterilization treatment varies depending on the treatment temperature, but in this invention, since a package of good heat conductivity is employed and the heat sterilization is conducted at a high temperature, the heat sterilization treatment can generally be accomplished in a relatively short time such as 10 to 600 seconds, with the result that reduction of flavor of the food content or deformation of the food content by boiling can be effectively prevented.

The heat sterilization can be conducted either batchwise or in a continuous manner. In this invention, since the heat sterilization treatment can be accomplished within a very short period, it is preferred that the package is heat-sterilized under pressure and cooled by employing an appropriate continuous pressing and sterilizing apparatus such as one comprising a heating and pressing sterilization chamber, a water-cooling chamber and hydraulic valves mounted on a feed inlet and a discharge outlet, respectively, and feeding packages into this apparatus by suitable transportation means.

The invention is illustrated in more detail by reference to the following examples that by no means limit the scope of the invention.

In the examples, all of the values of the interlaminar strength and seal strength are those as measured with respect to the machine direction.

EXAMPLE 1

A propylene-ethylene block copolymer having a melt flow index (MFI) of 1.0 g/10 min, an ethylene content of 4.7 mole % and a melting point of 157° C. was melt-extruded at 250° C. by using a T die of the manifold type having a diameter of 150 mm and the extrudate was passed through a chill toll maintained at 40° C. and subjected to a corona discharge treatment according to a customary method to obtain an undrawn film having a thickness of 70μ. The polypropylene film was found to have a crystal form of a combination of the α-monoclinic system and the pseudohexagonal system and the tension in the wet state was 44 dyne/cm just after preparation. The change of the tension in the wet state of this film with the lapse of time is illustrated in FIG. 5. The degree of orientation of the film was 0.736 and the salad oil extraction ratio was 163 ppm when the film was immersed in salad oil at 135° C. for 30 minutes. This polypropylene film was laminated with an aluminum foil having a thickness of 9μ and a polyethylene terephthalate film having a thickness of 12μ so that the aluminum layer was interposed between the two resin layers, when 3 days had passed since preparation of the polypropylene film. For this lamination was used an adhesive formed by mixing 150 parts by weight of a 20% solution of a polyester resin derived from a 1:1 mixture of ethylene glycol and propylene glycol and a 10:1 mixture of terephthalic acid and isophthalic acid (having a relative viscosity η rel of 1.12 as measured at 30° C. with respect to a 0.5% methylethyl ketone solution and a hydroxyl value of 33) in methylethyl ketone and 4 parts by weight of a 5% solution of a polyadduct derived from 1 mole of trimethylol propane and 3 moles of tolylene diisocyanate in ethyl acetate. Two rectangular samples having a size of 130 mm×170 mm were cut from the resulting laminate sheet and the samples were piled so that the polypropylene film layers confronted each other. In this piled state, the assembly was heat-sealed at 250° C. under a pressure of 3 Kg/cm² for 0.5 second along the width of 10 mm on both of the longitudinal sides and one lateral side to obtain a pouch having a seal strength of 7.5 Kg/20 mm width and the interlaminar strength between the aluminum foil and the polypropylene film was 750 g/20 mm width.

Hamburg steak having a thickness of 15 mm was put into the pouch from a non-sealed lateral side and heat sealing of this lateral side was conducted under the same conditions as described above. The packaged hamburg steak was subjected to the high-temperature short-time retort sterilization under a pressure of 3.2 Kg/cm² for 10 minutes. After the sterilization treatment, the polypropylene film was found to have completely a crystal form of the α-type monoclinic system and a degree of orientation of 1.03. During the high-temperature short-time sterilization, the pouch was not damaged by peeling in the bonded area or heat sealed area. The texture of the packaged hamburg steak was much better than that of the packaged hamburg steak which had been subjected to the customary retort sterilization treatment (120° C. and 30 minutes) and was hardly different from the texture of hamburg steak which was not sterilized at all.

COMPARATIVE EXAMPLE 1

A polypropylene film was prepared in the same manner as in Example 1 except that the melt extrusion temperature was changed to 280° C. The film had a crystal form of a combination of the α-type monoclinic system and the pseudohexagonal system and the tension in the wet state was 44 dyne/cm. The film had a degree of orientation of 0.711 and a salad oil extraction ratio of 170 ppm. The change of the tension in the wet state of the film with the lapse of time is shown in FIG. 5, from which it is apparent that the tension in the wet state was drastically reduced in a relatively short time after preparation of the film. When 3 days had passed since preparation of this film, in the same manner as described in Example 1, a laminate sheet was prepared by using this film, and a pouch was prepared from this laminate sheet in the same manner as described in Example 1. The interlaminar strength between the aluminum foil and the polypropylene film was 250 g/20 mm width and the seal strength was 7.2 Kg/20 mm width. Hamburg steak having a thickness of 15 mm was packaged in the pouch and retort-sterilized at 135° C. for 10 minutes. Violent delamination was caused between the aluminum foil and the polypropylene film, and it was found that the pouch could not be put into practical use as a container for preservation of food. The polypropylene film was found to have a crystal form of the α-type monoclinic system. The interlaminar strength was found to be 70 g/20 mm width and the degree of orientation was 0.98.

EXAMPLE 2

A film was prepared in the same manner as in Example 1 except that a propylene-ethylene copolymer having a melt flow index of 0.8 g/10 min and an ethylene content of 5.2 mole % was used as the polypropylene. The tension of the film in the wet state was 44 dyne/cm just after preparation and 42 dyne/cm when three days had passed since preparation of the film. The polypropylene film was characterized by a degree of orientation of 0.824, a salad oil extraction ratio of 89 ppm and a crystal form of a combination of the α-type monoclinic system and the pseudohexagonal system. In the same manner as described in Example 1, experiments were conducted by using the so prepared polypropylene film. After the retort sterilization treatment, the crystal form of the polypropylene film was of the α-type monoclinic system. The bonded area or heat sealed area was not damaged at all by the retort treatment. The interlaminar strength was 820 g/20 mm width before the retort treatment and 1190 g/20 mm width after the retort treatment. The degree of orientation of the polypropylene film after the retort treatment was 1.28.

COMPARATIVE EXAMPLE 2

A polypropylene film was prepared in the same manner as in Example 2 except that the film-forming temperature was changed to 280° C. This film was characterized by a degree of orientation of 0.801, a salad oil extraction ratio of 93 ppm and a crystal form of a combination of the α-type monoclinic system and the pseudohexagonal system. The tension in the wet state of the film was 45 dyne/cm just after preparation, but it was reduced to 37 dyne/cm when 3 days had passed since preparation of the film. By using this film, a pouch was prepared and the pouch was subjected to the retort sterilization treatment in the same manner as in Example 1. The interlaminar strength was 210 g/20 mm width before the retort treatment and 90 g/20 mm width after the retort heat treatment. The degree of orientation of the polypropylene film was 1.15. In the retorted pouch, violent delamination was observed between the aluminum foil and the polypropylene film, and it was confirmed that the pouch could not be put into a practical use as a seal container for preservation of food.

EXAMPLE 3

A film having a thickness of 50μ was prepared from the same resin as used in Example 2 at the same extrusion temperature as adopted in Example 2. The so prepared film was characterized by a degree of orientation of 0.818, a crystal form of a combination of the α-type monoclinic system and the pseudohexagonal system and a salad oil extraction ratio of 91 ppm. The tension in the wet state of the film was 44 dyne/cm just after preparation and 40 dyne/cm when 3 days had passed since preparation of the film. A 4-ply laminate sheet was prepared in the same manner as in Example 2 except that a biaxially stretched nylon film having a thickness of 15μ was interposed between the polypropylene film and the aluminum foil. The nylon film used was prepared by melt-extruding a nylon-6 resin obtained by condensation of ε-caprolactam and having a melting point of 215° C. and a relative viscosity η rel of 3.1 (as measured at 20° C. with respect to a 10 g/l solution in 98% sulfuric acid) and stretching the extrudate simultaneously biaxially at a draw ratio of 2.5 in either the longitudinal or lateral direction. The so prepared nylon film had a tensile modulus, E, of $1.93 \times 10^4$ Kg/cm$^2$, a tensile load, S, of 2.01 Kg/cm and an impact absorbing coefficiency, S/E, of $1.04 \times 10^{-4}$ cm. In the same manner as in Example 1, a pouch was prepared from the above 4-ply laminate sheet. The interlaminar strength between the nylon film and the polypropylene film was 960 g/20 mm width. A mixture of 160 ml of water and 20 ml of salad oil was filled in the pouch and subjected to a retort sterilization treatment at 135° C. for 10 minutes. No delamination was caused in the bonded or heat sealed area. After the retort sterilization treatment, the polypropylene film had a crystal form of the α-type monoclinic system and a degree of orientation of 1.25. The interlaminar strength between the nylon and polypropylene films was 850 g/20 mm width after the retort sterilization treatment.

The average pouch breakage ratio of this pouch was 0.0011, and even when it was filled with a liquid material, breakage or delamination or formation of pin holes was not caused during the course of distribution by external forces such as falling impact and vibration.

COMPARATIVE EXAMPLE 3 a polypropylene film having a thickness of 50μ was prepared in the same manner as in Example 3 except that the melt extrusion temperature was changed to 280° C. The so prepared film was characterized by a degree of orientation of 0.803, a salad oil extraction ratio of 94 ppm and a crystal form of a combination of the α-type monoclinic system and the pseudohexagonal system. The tesnion in the wet state of the film was 44 dyne/cm just after preparation and 37 dyne/cm when 3 days had passed since preparation of the film. By using the so prepared polypropylene film, a 4-ply laminate sheet was prepared in the same manner as in Example 3, and a pouch was prepared from this laminate sheet in the same manner as described in Example 1. The interlaminar strength between the nylon film and the polypropylene film was 350 g/20 mm width in the so prepared pouch. A mixture of 160 ml of water and 20 ml of salad oil was filled in the pouch, and the pouch was subjected to a retort sterilization treatment at 135° C. for 10 minutes. After the retort sterilization treatment, the interlaminar strength was 110 g/20 mm width and the degree of orientation of the polypropylene film was 1.21. Violent delamination was caused between the polypropylene film and the nylon film in the retorted pouch. It was confirmed that the pouch could not be put into practical use as a room temperature-distribution seal container for preservation of food because of insufficient sealing property and poor resistance to shock or vibration.

Results obtained in Examples 1 to 3 and Comparative Examples 1 to 3 are summarized in Table 1.

film by using the same adhesive as used in Example 1. The interlaminar strength was 570 g/20 mm width, and a pouch was prepared from this laminate sheet in the same manner as in Example 1. Three slices of ham were put into the pouch and the pouch was heat-sealed. The seal strength was 5.0 Kg/20 mm width. The pouch was then subjected to the retort sterilization treatment at 135° C. for 10 minutes. Breakage of the pouch by delamination was not caused. After the retort treatment, the crystal form of the polypropylene film was of the α-type monoclinic system and the degree of orientation of the polypropylene film was 2.13, and the interlaminar strength was 480 g/20 mm width and the seal strength was 4.9 Kg/20 mm width.

COMPARATIVE EXAMPLE 4

A polypropylene film having a thickness of 60μ was prepared in the same manner as in Example 4 except that the melt extrusion temperature was changed to

TABLE 1

| | Resin | Film-Forming Temperature (°C.) | Interlaminar Strength (g/20 mm width) | | | |
|---|---|---|---|---|---|---|
| | | | 3-ply pouch[c] between aluminum foil and polypropylene | | 4-ply pouch[d] between nylon and polypropylene | |
| | | | before retorting[e] | after retorting[e] | before retorting[e] | after retorting[e] |
| Example 1 | A[a] | 250 | 750 | 1140 | — | — |
| Examples 2 and 3 | B[b] | 250 | 820 | 1190 | 960 | 850 |
| Comparative Example 1 | A[a] | 280 | 250 | 70 | — | — |
| Comparative Examples 2 and 3 | B[b] | 280 | 210 | 90 | 350 | 110 |

| | Resin | Film-Forming Temperature (°C.) | Delamination after Retortion[e] | |
|---|---|---|---|---|
| | | | 3-ply pouch[c] between aluminum foil and polypropylene | 4-ply pouch[d] between nylon and polypropylene |
| Example 1 | A[a] | 250 | not caused | — |
| Examples 2 and 3 | B[b] | 250 | not caused | not caused |
| Comparative Example 1 | A[a] | 280 | violent | — |
| Comparative Examples 2 and 3 | B[b] | 280 | violent | violent |

[a]propylene-ethylene block copolymer having MFI of 1.0 and ethylene content of 4.7 mole %
[b]ethylene-propylene block copolymer having MFI of 0.8 and ethylene content of 5.2 mole %
[c]12 μ polyethyleneterephthalate film × 9 μ aluminum foil × 70 μ polypropylene film
[d]12 μ polyethyleneterephthalate film × 9 μ aluminum foil × 15 μ nylon 6 film × 50 μ polypropylene film
[e]retorting conditions: 135° C. × 10 minutes

EXAMPLE 4

A propylene-ethylene block copolymer having a melt flow index of 2.1 g/10 min, an ethylene content of 8 mole % and a melting point of 157° C. was melt-extruded at 240° C. through a T die of the manifold type having a diameter of 100 mm, and the extrudate was passed through a chill roll maintained at 60° C. and subjected to a corona discharge treatment according to a customary method to obtain a film having a thickness of 60μ. The tension in the wet state of the film was 45 dyne/cm just after preparation, 43 dyne/cm 3 days after preparation and 42 dyne/cm one week after preparation. The resulting film was characterized by a crystal form of a combination of the α-type monoclinic system and the pseudohexagonal system, a degree of orientation of 0.812 and a salad oil extraction ratio of 130 ppm. When one week had passed from preparation of the film, this film was laminated with an undrawn nylon 66

270° C. The resulting film was characterized by a crystal form of a combination of the α-type monoclinic system and the pseudohexagonal system, a degree of orientation of 0.793 and a salad oil extraction ratio of 140 ppm. The tension in the wet state of the film was 45 dyne/cm just after preparation, but it was reduced to 38 dyne/cm when 3 days had passed since preparation of the film. In the same manner as in Example 4 a 2-ply laminate sheet was prepared, and a pouch was prepared from this laminate in the same manner as in Example 1. The interlaminar strength was 360 g/20 mm width and the seal strength was 4.3 Kg/20 mm width. In the same manner as in Example 4, the pouch was subjected to the retort sterilization treatment. The crystal form of the polypropylene film was of the α-type monoclinic system and the degree of orientation of the polypropylene film was 2.01, and the interlaminar strength was 150 g/20 mm width and the seal strength was 2.1 Kg/20 mm width. Violent delamination was caused in the retorted pouch. It was confirmed that the pouch was insufficient in the resistance to falling impact or vibration and a good seal condition could not be maintained during the course of distribution.

EXAMPLE 5

100 parts by weight of a propylene-ethylene block copolymer having a melt flow index of 0.8 g/10 min, an ethylene content of 5.2 mole % and a melting point of 157° C. was dry-blended with 7 parts by weight of an ethylene-propylene rubber (EPR) having a melt flow index of 0.7 g/10 min and an ethylene content of 77 mole %, and the mixture was pelletized at 200° C. by a pelletizer. The pellet was melt-extruded at 250° C. by using a T die of the manifold type having a diameter of 65 mm, and the extrudate was passed through a chill roll maintained at 50° C. and subjected to a corona discharge treatment according to a customary method to obtain a film having a thickness of 70μ. The tension in the wet state of the film was 43 dyne/cm just after preparation and 40 dyne/cm 3 days after preparation. The film was characterized by a degree of orientation of 0.829, a salad oil extraction ratio of 98 ppm and a crystal form of a combination of the α-type monoclinic system and the pseudohexagonal system. The film was laminated with a polyethyleneterephthalate film having a thickness of 12μ and an aluminum foil having a thickness of 9μ by using the same adhesive as used in Example 1, so that the aluminum foil was interposed between the two resin films as an intermediate layer. A pouch was prepared from the resulting laminate sheet in the same manner as in Example 1. The interlaminar strength between the aluminum foil and the polypropylene film was 780 g/20 mm width and the seal strength was 7.9 Kg/20 mm width. A shrimp-incorporated curry soup (180 g) was filled in the pouch and the pouch was subjected to the retort sterilization treatment at 135° C. for 10 minutes. After the retort treatment, the polypropylene film had a crystal form of the α-type monoclinic system and a degree of orientation of 1.52. In the retorted pouch, the interlaminar strength was 980 Kg/20 mm width and the seal strength was 7.8 Kg/20 mm width. No delamination was caused between the aluminum foil and the polypropylene film during the retort sterilization treatment. Further, the pouch was excellent in the resistance to falling impact and vibration and could be advantageously used as a room temperature-distribution seal container for preservation of food.

COMPARATIVE EXAMPLE 5

A polypropylene film was prepared in the same manner as in Example 5 except that the melt extrusion temperature was changed to 290° C. The tension in the wet state of the film was 44 dyne/cm just after preparation but it was reduced 37 dyne/cm when 3 days had passed since preparation of the film. The film was characterized by a degree of orientation of 0.811, a salad oil extraction ratio of 105 ppm and a crystal form of a combination of the α-type monoclinic system and the pseudo-hexagonal system. In the same manner as in Example 5, a 3-ply pouch was prepared by using the so obtained film. The interlaminar strength between the aluminum foil and the polypropylene film was 330 g/20 mm width and the seal strength was 7.7 Kg/20 mm width. In the same manner as in Example 5, the pouch was subjected to the retort sterilization treatment. Violent delamination was caused between the aluminum foil and the polypropylene film. After the retort sterilization treatment, the crystal form of the polypropylene film was of the α-type monoclinic system and the film had a degree of orientation of 1.42. The interlaminar strength was 140 g/20 mm width and the seal strength was 7.3 Kg/20 mm width. In the retorted pouch, pin holes were formed by interlaminar delamination, and the pouch was readily broken under falling impact during the course of distribution. Accordingly, it could not be put into practical use as a seal container for preservation of sterilized precooked food.

EXAMPLE 6

A copolyester resin having a melting point of 261° C. and an intrinsic viscosity [η] of 0.82 (as measured at 30° C. in a 1:1 weight ratio mixture of phenol and tetrachloroethane, which was prepared by condensing a 91:9 (mole ratio) mixture of ethylene glycol and 1,4-butane diol with a 92:8 (mole ratio) mixture of dimethyl terephthalate and dimethyl isophthalate, was melt-extruded at 275° C. and biaxially stretched at a draw ratio of 3.0 in either the longitudinal or lateral direction to obtain a film having a thickness of 12μ. The resulting film was characterized by a tensile modulus, E, of 4.15 Kg/cm$^2$, a tensile load, S, of 2.35 Kg/cm and a impact absorbing coefficient, S/E, of 0.567 ×10$^{-4}$ cm. A 4-ply pouch was prepared in the same manner as in Example 3 except that the resulting film was used instead of the nylon 6 film used in Example 3. The interlaminar strength between the polypropylene film and the polyester film was 455 g/20 mm width. The pouch was filled with a mixture of 160 ml of water and 20 ml of salad oil and subjected to the retort sterilization treatment at 135° C. for 10 minutes. No breakage was observed in either the bonded area or the heat sealed area. After the retort treatment, the interlaminar strength was 380 g/20 mm width, and the average pouch breakage ratio of the pouch was 0.0253. During the course of distribution, formation of pin holes or breakage of the pouch was not caused. It was confirmed that the pouch was very excellent as a room temperature-distribution seal container for preservation of retorted food.

In the polyester film used in this Example, the elastic modulus value E was reduced by internal plasticization as compared with a conventional polyethyleneterephthalate film used in Comparative Example 7 and the tensile strength value S was increased by increasing the molecular weight, whereby the impact absorbing coefficiency S/E was maintained at a level higher than 0.5×10$^{-4}$ cm so as to obtain a film suitable for practising the invention.

COMPARATIVE EXAMPLE 6

A pouch was prepared in the same manner as in Example 6 except that the same polypropylene resin as used in Example 3 was employed and the melt extrusion temperature was changed to 285° C. The polypropylene film was characterized by a crystal form of a combination of the α-type monoclinic system and the pseudohexagonal system, a degree of orientation of 0.802 and a salad oil extraction ratio of 97 ppm. In the resulting pouch, the interlaminar strength between the polyester film and the polypropylene film was 124 g/20 mm width. In the same manner as in Example 6, the pouch was subjected to the retort sterilization treatment at 135° C. for 10 minutes. The polypropylene film after the retort sterilization treatment had a crystal form of the α-type monoclinic system and a degree of orientation of 1.20. During the retort sterilization treatment, violent delamination was caused between the polypropylene and polyester films, and the pouch could not be put into practical use as a seal container. The interlaminar strength was only 43 g/20 mm width.

COMPARATIVE EXAMPLE 7

A polyethyleneterephthalate resin having a melting point of 261° C. and an intrinsic viscosity $[\eta]$ of 0.621 (as measured at 30° C. in a 1:1 mixed solvent of phenol and tetrachloroethane), which was prepared from ethylene glycol and dimethyl terephthalate by condensation, was melt-extruded at 285° C. and biaxially stretched at a draw ratio of 3.0 in either the longitudinal or lateral direction to obtain a polyester film having a thickness of 12$\mu$, an elastic modulus, E, of $5.08 \times 10^4$ Kg/cm$^2$, a tensile load, S, of 1.96 Kg/cm and an impact absorbing coefficient, S/E, of $0.385 \times 10^{-4}$ cm. A pouch was prepared in the same manner as in Example 6 except that this polyester film was used instead of the polyester film used in Example 6. The interlaminar strength between the polyester film and the polypropylene film was 510 g/20 mm width. When the pouch was subjected to the retort sterilization treatment at 135° C. for 10 minutes in the same manner as in Example 6, no delamination was caused between the resin films but the average pouch breakage ratio was as high as 0.0721. Thus, it was confirmed that the pouch could not be put into practical use because of insufficient resistance to falling impact.

EXAMPLES 7 to 10 and COMPARATIVE EXAMPLES 8 to 11

A propylene-ethylene copolymer resin having a melt flow index of 3.0 g/10 min, an ethylene content of 3.0 mole % and a melting point of 151° C. was melt-extruded at 230° C., and the extrudate was passed through a chill roll maintained at 60° C. and subjected to a corona discharge treatment to obtain an undrawn film having a thickness of 50$\mu$. The tension in the wet state of the film was 46 dyne/cm just after preparation and 40 dyne/cm 1 week after preparation. The film was characterized by a crystal form of the pseudohexagonal system, a degree of orientation of 0.51 and a salad oil extraction ratio of 83| ppm.

The polypropylene film was laminated with an intermediate film indicated in Table 2, and aluminum foil having a thickness of 9$\mu$ and a polyethyleneterephthalate film having a thickness of 12$\mu$ in an order recited above by using a urethane type adhesive formed by mixing 100 parts by weight of a hydroxyl group-terminated urethane-modified adipic acid ester (Nippolan # 3002 manufactured by Nippon Polyurethane) with 10 parts by weight of a polyisocyanate formed by adding 3 moles of tolylene diisocyanate to 1 mole or trimethylol propane (Desmodur L manufactured by Bayer AG), and in the same manner as described in Example 1, eight pouches were prepared by using the so obtained laminate sheets. When these pouches were subjected to the retort sterilization treatment at 135° C. for 10 minutes, no delamination was caused in any of the pouches. After the retort sterilization treatment, the polypropylene film had a crystal form of the $\alpha$-type monoclinic system and a degree of orientation of 0.63. Results obtained are shown in Table 2. As will be apparent from Table 2, pouches having an impact absorbing coefficient, S/E, lower than $0.5 \times 10^{-4}$ cm could not put into practical use because the average pouch breakage ratio was very high.

TABLE 2

| | Impact-Absorbing Layer | | Tensile Modulus E (Kg/cm$^2$) | Tensile Load S under 30% Elongation (Kg)/cm | S/E (cm) | Average Pouch Breakage Ratio PR |
|---|---|---|---|---|---|---|
| | Resin | Thickness($\mu$) | | | | |
| Example 7 | polycarbonate$^{(a)}$ | 20 | $2.33 \times 10^4$ | 1.44 | $0.62 \times 10^{-4}$ | 0.0301 |
| Example 8 | polyester ether$^{(b)}$ | 30 | $0.41 \times 10^4$ | 0.60 | $1.48 \times 10^{-4}$ | 0.0334 |
| Example 9 | polypropylene (B)$^{(c)}$ | 18 | $1.77 \times 10^4$ | 0.97 | $0.55 \times 10^{-4}$ | 0.0517 |
| Example 10 | nylon-12$^{(d)}$ | 20 | $1.50 \times 10^4$ | 0.75 | $0.50 \times 10^{-4}$ | 0.0538 |
| Comparative Example 8 | polyethylene terephthalate$^{(e)}$ | 16 | $4.49 \times 10^4$ | 2.12 | $0.48 \times 10^{-4}$ | 0.1004 |
| Comparative Example 9 | polyethylene naphthalate$^{(f)}$ | 12 | $5.08 \times 10^4$ | 1.95 | $0.38 \times 10^{-4}$ | 0.1046 |
| Comparative Example 10 | polypropylene (C)$^{(g)}$ | 22 | $1.47 \times 10^4$ | 0.75 | $0.48 \times 10^{-4}$ | 0.1366 |
| Comparative Example 11 | polyethylene terephthalate$^{(h)}$ | 12 | $5.32 \times 10^4$ | 1.56 | $0.29 \times 10^{-4}$ | 0.2173 |

(a): polycarbonate film having a specific gravity of 1.2, a glass transition temperature of 141° to 149° C. and a melting point of 220° to 230° C.

(b): polyester-polyether block copolymer film having a specific gravity of 1.228 and a melting point of 215° C.

(c): polypropylene film having a specific gravity of 0.908 and a degree of orientation of 0.77 (before the retort treatment)

(d): nylon-12 film having a specific gravity of 1.01 and a melting point of 178° C.

(e): polyethylene terephthalate film having a specific gravity of 1.4 and a melting point of 260° C.

(f): polyethylene-2,6-naphthalate film having a specific gravity of 1.362, a melting point of 272° C. and a glass transition temperature of 113° C.

(g): polypropylene film having a specific gravity of 0.91 and a degree of orientation of 9.6 (before the retort treatment)

(h): the same film as (e) but different in the thickness.

COMPARATIVE EXAMPLES 12 to 15

Pouches were prepared in the same manner as in Example 7 except that the same polypropylene resin as used in Examples 7 to 10 was melt-extruded at 270° C. and the same intermediate films as used in Examples 7 to 10 were used, respectively. In these pouches, the polypropylene film was characterized by a crystal form of the pseudohexagonal system, a degree of orientation of 0.49 and a salad oil extraction ratio of 831 ppm. When these pouches were subjected to the retort sterilization treatment at 135° C. for 10 minutes, delamination was caused in each of the pouches and none of them could be put into practical use. After the retort sterilization treatment, the polypropylene film had a crystal form of the α-type monoclinic system and a degree of orientation of 0.60.

COMPARATIVE EXAMPLE 16

A 2-ply pouch was prepared in the same manner as in Example 4 except that a biaxially stretched polypropylene film having a degree of orientation of 9.6, a crystal form of the α-type monoclinic system and a thickness of 30μ was used as the inner face polypropylene film. The interlaminar strength was 120 g/20 mm width and the seal strength was 1.8 Kg/20 mm width. The pouch was subjected to the retort sterilization treatment at 135° C. for 10 minutes in the same manner as in Example 4. The pouch was shrunk by 3.1% in the transverse direction and by 1.7% in the machine direction, and violent delamination was caused in the bonded area.

What we claim is:

1. A packaging material for food to be subjected to high-temperature short-time sterilization, which comprises a flexible laminate sheet including (a) a heat-sealable inner face layer of a crystalline polypropylene and (b) a heat-resistant resin outer face layer of a thermoplastic resin having a melting point or decomposition point higher than the melting point of said polypropylene, said thermoplastic resin being selected from the group consisting of
   (a) polyesters and copolyesters comprising recurring units expressed by the following formula

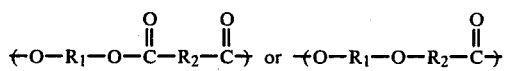

wherein $R_1$ is an alkylene or cycloalkylene group having 2 to 8 carbon atoms, and $R_2$ is an arylene group,
   (b) polyamides and copolyamides comprising recurring units expressed by the following formula

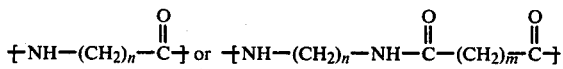

wherein n is a number of 3 to 13 and m is a number of 4 to 11,
   (c) polycarbonates comprising recurring units represented by the following formula

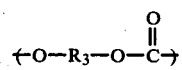

wherein $R_3$ is a hydrocarbon group having 8 to 15 carbon atoms,
   (d) biaxially stretched isotactic polypropylene films, and
   (e) acetyl cellulose,
said heat-sealable inner face layer of said crystalline polypropylene film being characterized in that (i) said film is one prepared by melting in an extruder a crystalline polypropylene having a melt flow index of 0.5 to 3, extruding the melt in the form of a film at a temperature of 230° to 260° C., through a T die, and contacting the extruded film with a chill roll having a surface temperature of 20° to 70° C., to thereby cool rapidly and solidify the film, (ii) when the film is extracted in salad oil at 130° C. for 30 minutes, the amount extracted of the polypropylene is smaller than 1500 ppm, (iii) the polypropylene film has a pseudohexogonal crystal form or a crystal form of a combination of the pseudohexogonal system and α-monoclinic system and a degree of orientation not higher than 3.0 and (iv) the surface of the polypropylene film confronting the layer (b) has a tension in the wet state ($T_1$) of at least 38 dyne/cm when it is allowed to stand still in an atmosphere of a temperature of 20° C. and a relative humidity of 40% for 1 week.

2. A packaging material according to claim 1 wherein said laminate sheet comprises (c) an oxygen-barrier layer interposed between said layers (a) and (b).

3. A packaging material according to claim 2 wherein the oxygen-barrier layer (c) is an aluminum foil.

4. A packaging material according to claim 2 wherein the polypropylene layer (a) has a thickness of 30 to 100μ, the intermediate oxygen-barrier layer (c) has a thickness of 10 to 50μ and the heat-resistant resin layer (b) has a thickness of 2 to 30μ.

5. A packaging material according to claim 1 wherein the heat-resistant resin layer (b) is composed of a polyethylene terephthalate.

6. A packaging material according to claim 1 wherein the polypropylene layer (a) has a thickness of 30 to 100μ and the heat-resistant resin layer (b) has a thickness of 10 to 50μ.

7. A packaging material according to claim 6 wherein the thermoplastic resin constituting layer (d) has a free surface energy of at least 35 dyne/cm.

8. A packaging material according to claim 1 wherein adjacent layers of the laminate sheet are bonded together with an adhesive selected from an isocyanate type adhesive, an epoxy type adhesive or an isocyanate-epoxy type adhesive.

9. A packaging material as set forth in claim 1 wherein the polypropylene film has (i) a salad oil extraction ratio not higher than 500 ppm, (ii) a tension in the wet state of at least 40 dyne/cm and (iii) a degree of orientation of 0.4 to 2.3.

10. A packaging material as set forth in claim 1 wherein the decrease (ΔW) of the wetting tension, defined by the following formula, of the polypropylene film is not larger than 6 dyne/cm, especially not higher than 4 dyne/cm:

$$\Delta W = W_O - W_1$$

wherein $W_O$ denotes the wetting tension (dyne/cm) of the polypropylene film just after preparation and $W_1$ denotes the wetting tension (dyne/cm) of the film when it is allowed to stand still in an atmosphere of a temperature of 20° C. and a relative humidity of 40% for 1 week.

11. A packaging material for food to be subjected to high-temperature short-time sterilization, which comprises a flexible laminate sheet including (a) a heat-sealable inner face layer of a crystalline polypropylene, (b) a heat-resistant outer face layer of a thermoplastic resin having a melting point or decomposition point higher than the melting point of said polypropylene, (c) an oxygen-barrier layer interposed between said layers (a) and (b), and (d) a layer or layers of thermoplastic resin interposed between layers (a) and (c) and/or layers (b) and (c), said heat-resistant thermoplastic resin layer (b) being selected from the group consisting of polyesters and copolyesters comprising recurring units expressed by the following formula:

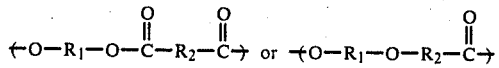

wherein $R_1$ is an alkylene or cycloalkylene group having 2 to 8 carbon atoms, and $R_2$ is an arylene group, said thermoplastic resin layer (d) having an impact absorbing coefficient, $K_I$, of at least $0.5 \times 10^{-4}$ cm, said value $K_I$ being defined by the formula $K_I = S/E$ in which S is the load (in kg/cm) of the resin film having a width of 1 cm under 30% elongation and E is the tensile strength (in kg/cm$^2$) of the resin film S and E both being measured after the high-temperature short-time sterilization, said polypropylene layer being composed of a film of a polypropylene having a melt flow index of 0.5 to 3, said film being characterized in that (i) said film is one prepared by melting in an extruder a crystalline polypropylene having a melt flow index of 0.5 to 3, extruding the melt in the form of a film at a temperature of 230° to 260° C., through a T die, and contacting the extruded film with a chill roll having a surface temperature of 20° to 70° C., to thereby cool rapidly and solidify the film, (ii) when the film is extracted in salad oil at 130° C. for 30 minutes, the amount extracted of the polypropylene is smaller than 1500 ppm, (iii) the polypropylene film has a pseudohexagonal crystal form or a crystal form of a combination of the pseudohexagonal system and α-monoclinic system and a degree of orientation not higher than 3.0 and (iv) the surface of the polypropylene film confronting the oxygen-barrier layer (c) has a tension in the wet state ($T_1$) of at least 38 dyne/cm when it is allowed to stand still in an atmosphere of a temperature of 20° C. and a relative humidity of 40% for 1 week.

12. A packaging material according to claim 11 wherein the oxygen-barrier layer (c) is an aluminum foil.

13. A packaging material according to claim 11 wherein the thermoplasic resin constituting layer (d) is a resin selected from a polyamide resin, a polycarbonate resin, a polyester-polyether resin or a polyester-polylactone resin.

14. A packaging material according to claim 13 wherein layer (d) is composed of a nylon selected from nylon-6, nylon-6,6 or nylon-12.

15. A packaging material according to claim 13 wherein layer (d) is composed of a polyester-polyether having recurring units represented by the following formula:

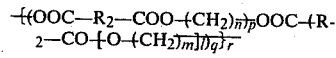

wherein $R_2$ is a phenylene group, n has a value from 2 to 4, m has a value from 2 to 5, l has a value of at least 2, and p,q and r each has a value of at least 1.

16. A packaging material according to claim 11 wherein layer (d) has a thickness of 5 to 40μ.

17. A packaging material acccording to claim 16 wherein the polypropylene layer (a) has a thickness of 30 to 100μ, the thermoplastic resin layer (d) has a thickness of 5 to 40μ, the oxygen-barrier layer (c) has a thickness of 5 to 20μ and the heat-resistant resin layer (b) has a thickness of 5 to 20μ.

18. A packaging material for food to be subjected to high-temperature short-time sterilization, which comprises a flexible laminate sheet including (a) a heat-sealable inner face layer of a crystalline polypropylene and (b) a heat-resistant outer face layer of a thermoplastic resin having a melting point or decomposition point higher than the melting point of said polypropylene, said thermoplastic resin being selected from the group consisting of (a) polyesters and copolyesters comprising recurring units expressed by the following formula:

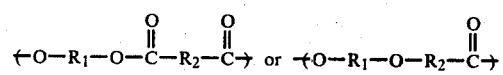

wherein $R_1$ is an alkylene or cycloalkylene group having 2 to 8 carbon atoms, and $R_2$ is an arylene group, (b) polyamides and copolyamides comprising recurring units expressed by the following formula:

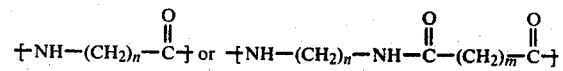

wherein n is a number of 3 to 13 and m is a number of 4 to 11, (c) polycarbonates comprising recurring units represented by the following formula:

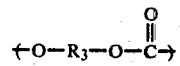

wherein $R_3$ is a hydrocarbon group having 8 to 15 carbon atoms, (d) biaxially stretched isotactic polypropylene films, and (e) acetyl cellulose, said heat-sealable inner face layer of said crystalline polypropylene film being characterized in that (i) said film is one prepared by melting in an extruder a crystalline propylene-ethylene block copolymer having 2 to 10% by weight based on the total copolymer of ethylene, and extruding the melt in the form of a film at a temperature of 230° to 260° C., through a T die, and contacting the extruded film with a chill roll having a surface temperature of 20° to 70° C., to thereby cool rapidly and solidify the film, (ii) when the film is extracted in salad oil at 130° C. for 30 minutes, the amount extracted of the copolymer is smaller than 1500 ppm, (iii) the film has a pseudohexagonal crystal form or a crystal form of a combination of the pseudohexagonal system and α-monoclinic system and a degree of orientation not higher than 3.0 and (iv) the surface of the film confronting the layer (b) has a tension in the wet state ($T_1$) of at least 38 dyne/cm when it is allowed to stand still in an atmosphere of a temperature of 20° C. and a relative humidity of 40% for 1 week.

* * * * *